US006844077B2

(12) United States Patent
Squier et al.

(10) Patent No.: US 6,844,077 B2
(45) Date of Patent: Jan. 18, 2005

(54) HIGH BARRIER METALLIZED FILM WITH MIRROR-LIKE APPEARANCE

(75) Inventors: Jo Ann H. Squier, Bloomfield, NY (US); Mark W. Lockhart, Fairport, NY (US)

(73) Assignee: ExxonMobil Oil Corporation, Irving, TX (US)

( * ) Notice: Subject to any disclaimer, the term of this patent is extended or adjusted under 35 U.S.C. 154(b) by 125 days.

(21) Appl. No.: 10/400,056

(22) Filed: Mar. 26, 2003

(65) Prior Publication Data

US 2004/0191541 A1 Sep. 30, 2004

(51) Int. Cl.$^7$ .......................... B32B 15/00; B29C 47/06
(52) U.S. Cl. ...................... 428/457; 428/458; 428/516; 428/910; 427/171; 427/250; 427/322; 427/569; 427/576; 156/244.11
(58) Field of Search ................... 428/457, 458, 428/461, 516, 910; 427/171, 250, 322, 569, 576; 264/173.14; 156/244.11

(56) References Cited

U.S. PATENT DOCUMENTS

| 5,194,318 A | 3/1993 | Migliorini et al. ......... 428/215 |
|---|---|---|
| 5,340,646 A | 8/1994 | Morita et al. ............. 428/307.3 |
| 5,360,892 A | 11/1994 | Bonsignore et al. ........ 528/354 |
| 5,422,377 A | 6/1995 | Aubert ........................ 521/64 |
| 5,556,711 A | 9/1996 | Ajioka et al. ............... 428/460 |
| 5,631,066 A | 5/1997 | O'Brien ...................... 428/195 |
| 5,663,288 A | 9/1997 | Shinoda et al. ............. 528/354 |
| 5,866,634 A | 2/1999 | Tokushige et al. .......... 523/124 |
| 6,153,276 A | * 11/2000 | Oya et al. ................... 428/35.2 |
| 6,156,929 A | 12/2000 | Chandler et al. ........... 562/582 |
| 6,235,825 B1 | 5/2001 | Yoshida et al. ............. 524/314 |
| 6,326,440 B1 | 12/2001 | Terada et al. ............... 525/411 |
| 6,329,048 B1 | 12/2001 | Balloni et al. .............. 428/349 |
| 6,391,425 B1 | 5/2002 | Migliorini et al. .......... 428/172 |
| 6,410,124 B1 | 6/2002 | Peet ........................... 428/215 |
| 6,420,041 B1 | 7/2002 | Amon et al. ................ 428/461 |
| 6,495,266 B1 | 12/2002 | Migliorini ................... 428/461 |
| 2002/0150775 A1 | 10/2002 | Ishikawa et al. ............ 428/458 |
| 2002/0198332 A1 | 12/2002 | Kasemura et al. .......... 442/327 |

FOREIGN PATENT DOCUMENTS

| EP | 974 615 A1 | 1/2000 |
|---|---|---|
| WO | WO 02/45958 A2 | 6/2002 |

\* cited by examiner

*Primary Examiner*—Monique R. Jackson
(74) *Attorney, Agent, or Firm*—Rick F. James

(57) ABSTRACT

A metallized, multi-layer film is disclosed that comprises at least a polyolefin layer, a tie layer, and a metallized lactic acid polymer layer to yield a final film having improved moisture and gas barrier, optical, and mechanical properties.

13 Claims, No Drawings

HIGH BARRIER METALLIZED FILM WITH MIRROR-LIKE APPEARANCE

The present invention relates to polymeric films and, more particularly, to multi-layer films that comprise at least a polyolefin layer and a metallized, lactic acid polymer layer having improved optical properties and improved moisture and gas barrier properties.

BACKGROUND OF THE INVENTION

Polymeric films are widely used in packaging applications for various food and non-food items. When unmodified, such films often lack sufficient moisture and gas barrier properties needed for many packaging applications. For example, biaxially-oriented, polypropylene films are particularly preferred in the manufacture of packaging films due to their low cost and good mechanical properties. Although such films may offer good moisture barrier properties, they lack suitable gas barrier properties for many packaging applications.

Metallic films, such as aluminum foil, are well known in the art for packaging applications. Such metallic films may have both desirable moisture and gas barrier properties, but are high cost. Also, metallic films lack mechanical properties suitable for many packaging applications.

To improve gas and moisture barrier properties, multi-layer films have been developed that offer the advantages of both polymeric films and metallic films. Such multi-layer films may typically comprise a polymeric core layer in combination with one or more other polymeric layers or metallized layers. For example, metallized, high barrier films may typically have an oriented polypropylene film core layer, a metallized layer and a sealant layer. Although these high barrier films may provide good moisture and gas barrier properties and good optical properties, such films may be difficult to manufacture and their moisture barrier properties may decline after end-use packaging operations.

Multi-layer, metallized films comprised of one or more layers containing ethylene vinyl alcohol ("EVOH") polymers may have good gas barrier properties, but exhibit weak moisture barrier properties. To improve moisture barrier properties, EVOH-containing films have been co-extruded with high-density polyethylene. Such co-extruded films may exhibit superior gas barrier properties, very good moisture barrier properties, but may have significant manufacturing issues, such as die lip build up and unstable thin layer co-extrusion quality. Moreover, such co-extruded films may not exhibit an optical appearance that is comparable to the mirror-like appearance of aluminum foil or metallized, polyethylene terephthalate (METPET) film.

Metallized, lactic acid polymer films (MET PLA) have a core layer comprised of a homopolymer of lactic acid, or a copolymer of lactic acid and another polymer, as disclosed in U.S. Pat. No. 5,556,711, the specification of which is incorporated herein by reference. MET PLA films may have desirable gas barrier properties and desirable mechanical properties. However, such MET PLA films are not suitable in many packaging applications because of high moisture permeability.

Hence, there is a need for a multi-layer film that has desirable moisture and gas barrier properties and displays a mirror-like appearance. Such a film should retain its desirable barrier properties after end-use packaging operations and be competitive with prior art films. The present invention meets this and other needs.

SUMMARY OF THE INVENTION

The present invention provides a metallized, multi-layer film having at least a three-layer structure comprised of a polyolefin core layer, a first tie layer and a metal receiving lactic acid polymer layer to yield a final film having improved gas and moisture barrier properties, improved mechanical properties, and a mirror-like appearance. Preferably, the polyolefin in the core is selected from the group consisting of polyethylene, polypropylene, and mixtures thereof. The lactic acid polymer layer is preferably metallized with aluminum and comprises a lactic acid homopolymer, or a copolymer of lactic acid and another hydroxycarboxylic acid. The first tie layer preferably comprises at least a functionalized polymer that is suitable for adhering lactic acid-containing polymers to the core layer. Suitable functionalized polymers include, but are not limited to, ethylene vinyl acetate, vinyl acetate, maleic anhydride, and mixtures thereof.

In another embodiment, the metallized, multi-layer film is a four-layer structure that further comprises a skin layer that is disposed on a side of the polyolefin core layer opposite the first tie layer. The skin layer preferably comprises at least a polyolefin. In still another embodiment, the metallized, multi-layer film is a five-layer structure that comprises a second tie layer and a skin layer disposed on the three-layer structure described above. The second tie layer is disposed on a side of the core layer that is opposite the first tie layer. Preferably, the second tie layer comprises at least a polyolefin or a functionalized polymer. The skin layer is disposed on a side of the second tie layer that is opposite the core layer and comprises at least a polyolefin.

DESCRIPTION OF PREFERRED EMBODIMENTS

In one embodiment of this invention, the metallized, multi-layer film is at least a three-layer, "ABC" structure comprising a metal receiving layer A, a first tie layer B and a core layer C. Core layer C comprises any suitable polyolefin, which includes, but is not limited to, polyethylene, polypropylene, polybutylene, and mixtures thereof. Preferably, core layer C comprises a homopolymer of ethylene, a homopolymer of propylene, or a copolymer of ethylene and propylene. First tie layer B is disposed on a first side of core layer C and functions to adhere core layer C to metal receiving layer A. Core layer C may be clear or opaque, the opacity being created by the well-known technology consisting of voiding or cavitating the polymer by inclusion of voiding or cavitating agents, well known in the art. First tie layer B comprises any suitable functionalized polymer, which includes, but is not limited to vinyl acetate, ethylene vinyl acetate, maleic anhydride, and mixtures thereof. Metal receiving layer A is disposed on a side of tie layer B that is opposite core layer C. Preferably metal receiving layer A comprises a homopolymer of lactic acid or a copolymer of lactic acid and another hydroxycarboxylic acid. Suitable hydroxycarboxylic acids which may be used include, but are not limited to glycolic acid, 3-hydroxybutyric acid, 4-hydroxybutyric acid, 4-hydroxyvaleric acid, 5-hydroxyvaleric acid, 6-hydroxycaproic acid, and mixtures thereof. Metal receiving layer A is metallized with any suitable metal using known methods, such as electroplating, sputtering or vacuum deposition. Such suitable metals include, but are not limited to, aluminum, copper, silver, chromium, and mixtures thereof. Upon metallization, a thin metal layer is deposited on metal receiving layer A to produce a final film having a smooth, mirror-like appearance.

In another embodiment of this invention, the metallized, multi-layer film is a four-layer, "ABCE" structure that further comprises a skin layer E that is disposed on a side of core layer C that is opposite the first tie layer B. Skin layer E comprises any suitable polymer that adheres to core layer C and functions to receive printing inks or dyes or other coatings or films. Suitable polymers include, but are not limited to, polyolefins, such as polyethylene, polypropylene, polybutylene, and mixtures thereof. Such suitable polymers also include functionalized polymers that contain EVOH, ethylene glycol, lactic acid, and mixtures thereof.

In still another embodiment of the invention, the metallized, multi-layer film is a five-layer, "ABCDE" structure that comprises a second tie layer D and skin layer E that are disposed on the three-layer structure described above. The second tie layer D is disposed on a side of core layer C that is opposite the first tie layer B. Second tie layer D comprises any suitable polymer that functions to adhere core layer C to any other skin layer. Suitable polymers include, but are not limited to, polyolefins, such as polyethylene, polypropylene, polybutylene, and mixtures thereof. Such suitable polymers also include functionalized polymers that comprise EVOH, ethylene glycol, lactic acid, and mixtures thereof. Second tie layer D may have the same composition as core layer C. In such case, the five-layer, "ABCDE" structure in this embodiment is equivalent to that of the four-layer, "ABCE" structure described above. Skin layer E for the five-layer, "ABCDE" structure is disposed on a side of tie layer D that is opposite core layer C. Skin layer E comprises any suitable polymer that adheres to a core layer and functions to receive printing inks or dyes or other coatings or films. Suitable polymers include, but are not limited to, polyolefins, such as polyethylene, polypropylene, polybutylene, and mixtures thereof. Such suitable polymers also include functionalized polymers that contain EVOH, ethylene glycol, lactic acid, and mixtures thereof.

Each of the multi-layer films of this invention have a total gauge thickness from about 0.4 mil to 2.5 mil, preferably about 0.7 mil, and more preferably about 1.0 mil. Core layer C represents from about 80% to 82% of the multi-layer film, by weight. First tie layer B represents about 10% of the multi-layer film, by weight. Metal receiving layer A represents from about 2% to 4% of the multi-layer film, by weight. Second tie layer D represents about 5% of the multi-layer film, by weight. Print receiving layer E represents about 2% of the film, by weight. Each of the layers that comprise the multi-layer film may be co-extruded and the base film produced thereby may be biaxially oriented using conventional means known in the art.

As used herein, the term "mixtures", when used in connection with polymers, is intended to include copolymers, terpolymers or any polymer produced by chemical reaction as well as polymer blends or physical mixtures of polymers.

EXAMPLES

The present invention will hereinafter be illustrated in detail by way of comparative examples.

Two metallized, multi-layer films, Film 1 and Film 2, were produced, each having the "ABCDE" structure, discussed above. The total gauge thickness for Film 1 and Film 2 were 1.0 mil and 1.5 mil, respectively. Core layer C was comprised of a propylene-ethylene copolymer with about 99.5% propylene and 0.5% ethylene, by weight, identified as EP 4712, available from ExxonMobil Chemical Company. First tie layer B was comprised of a copolymer containing maleic anhydride, identified as Admer® 1179, available from Mitsui Chemical Company. Metal receiving layer A was comprised of a lactic acid homopolymer, identified as Cargill-Dow 4042D, available from The Cargill-Dow Chemical Company. Second tie layer D was comprised of EP 4712. Print receiving layer E was comprised of an ethylene-propylene copolymer, identified as 8573, available from Atofina Petrochemical Company.

The metallized, multi-layer films of this invention were manufactured using conventional co-extrusion equipment and technology that is well known in the art. Each of the polymer resins that comprised the films were melted in a separate extruder, fed into a multi-layer die, and the hot sheet resulting therefrom was extruded onto a cast roll to form a cast sheet. The cast sheet was then quenched and the base film formed thereby was stretched in an orientation process well known in the art. In the machine direction (MD), the film was fed through a series of nips and rollers to stretch the film under controlled heat. After MD orientation, the film was oriented in the transverse direction (TD). The MD-oriented film was fed into ovens where controlled preheat, oven and annealing zone temperatures permit the stretching of the film in the TD. Such TD orientation results in a biaxially oriented film of the desired thickness of 1.0 mil, and 1.5 mil, respectively. After orientation and prior to the metallization, the metal receiving layer of the multi-layer film is treated using any conventional methods known in the art, such as corona, flame, plasma treatment and the like, to increase its surface tension.

The multi-layer films of this invention were stretched about 4.5 times in the machine direction and about 7.5 to 8 times in the transverse direction. The resultant multi-layer film displayed a smooth surface. This film was metallized by vacuum deposition of aluminum onto metal receiving layer A to an optical density of about 2.6 by a process well known in the art.

The barrier properties for the metallized films of this invention, Film 1 and Film 2, were evaluated using standard testing procedures known in the art. Moisture barrier properties were evaluated by determining the water vapor transmission rate (WVTR) of the films according to ASTM F1249 methods. Gas barrier properties were evaluated by determining the oxygen transmission rate (OTR) of the films according to ASTM D3985 methods. Prior art films (Film 3 and Film 4) were also evaluated for comparison. Film 3 was a metallized, EVOH-containing film having 0.9 mil gauge thickness. Film 4 was a known metallized, high barrier, oriented polypropylene film having a 0.7 mil gauge thickness. The barrier properties for these films are shown in Table I.

TABLE I

| FILM TYPE | GAUGE THICKNESS (mil) | WVTR gm/100 in$^2$/24 hr 100° F. @ 90% RH | OTR cc/100 in$^2$/24 hr 72° F. @ 0% RH |
| --- | --- | --- | --- |
| Film 1 | 1.00 | 0.0060 | .07 |
| Film 2 | 1.50 | 0.0035 | .08 |
| Film 3 | 0.90 | 0.020 | .005 |
| Film 4 | 0.70 | 0.015 | 1.67 |

As shown in Table I, Film 1 and Film 2 of this invention yielded WVTR barrier properties that were below 0.010 gm/100 in$^2$/24 hr at 100° F. at 90% relative humidity (RH) and were significantly better than those for a metallized, EVOH-containing film (Film 3) and a metallized, high barrier film (Film 4). In addition, the WVTR for the films of the present invention were also better than those for other prior art films, such as metallized, biaxially oriented, polypropylene films and METPET films (data not shown). The OTR properties of Film 1 and Film 2 were below 0.10 cc/100 in$^2$/24 hr at 72° F. at 0% RH. These OTR properties were better than that for metallized, high barrier film (Film 4), but less than that for EVOH-containing films (Film 3). Moreover, these OTR properties were comparable to those for METPET, but better than those for a metallized, biaxially oriented polypropylene film (data not shown).

The barrier properties for the metallized films of the present invention were further evaluated to determine the effect of end-use packaging operations. A second batch of Film 1 was prepared according to this invention. The barrier properties of Film 1 was then compared to prior art films (Film 3 and Film 4). The results of the evaluation are shown in Table II. The WVTR for Film 1 was substantially unchanged after machining and comparable to the change in WVTR for metallized, EVOH-containing film (Film 3). However, the change in WVTR for the metallized film of this invention (Film 1) was much better than the change observed for metallized, high barrier film (Film 4). The change in OTR for the metallized film of this invention was substantially stable after machining, and comparable to the OTR change for Film 3. However, the OTR for Film 1 was markedly better than the OTR for Film 4 before machining as well as after machining.

TABLE II

| FILM TYPE | WVTR gm/100 in$^2$/24 hr 100° F. @ 90% RH | | OTR cc/100 in$^2$/24 hr 72° F. @ 0% RH | |
|---|---|---|---|---|
| | Before Machining | After Machining | Before Machining | After Machining |
| Film 1 | 0.007 | 0.006 | 0.200 | 0.219 |
| Film 3 | 0.010 | 0.010 | 0.005 | 0.005 |
| Film 4 | 0.006 | 0.037 | 1.561 | 11.68 |

The optical properties for the metallized films of the present invention and other prior art metallized films were evaluated by visual appearance. The metallized, multi-layer films of this invention, Film 1 and Film 2, displayed a high chrome, mirror-like optical appearance that were comparable to METPET, but better than other metallized, high barrier films. METPET is recognized as having a mirror-like optical appearance. In addition, the films of the present invention did not have a bluish appearance or a matte dull reflection that is often displayed by metallized, EVOH-containing films.

The foregoing examples are not intended to limit the scope of the present invention. Although the present invention is described with preferred embodiments, it is understood that modifications and variations may be included, without departing from the spirit and scope of this invention as those skilled in the pertinent art will readily understand. Such modifications and variations are considered to be within the scope of the appended claims.

We claim:

1. A metallized multi-layer film comprising:
   (a) a core layer comprising at least a first polyolefin;
   (b) a first tie layer on a first side of said core layer, said first tie layer comprising at least a functionalized polymer; and
   (c) a metal receiving layer on a side of said first tie layer opposite said core layer, said metal receiving layer comprising i) a homopolymer of lactic acid, or ii) a copolymer of lactic acid and a hydroxycarboxylic acid, and having a thin metal layer deposited thereon.

2. The metallized multi-layer film of claim 1,
   wherein said first polyolefin is selected from the group consisting of polyethylene, polypropylene, polybutylene, and mixtures thereof;
   wherein said functionalized polymer is selected from the group consisting of vinyl acetate, ethylene vinyl acetate, maleic anhydride, and mixtures thereof;
   wherein said hydroxycarboxylic acid is selected from the group consisting of glycolic acid, 3-hydroxybutyric acid, 4-hydroxybutyric acid, 4-hydroxyvaleric acid, 5-hydroxyvaleric acid, 6-hydroxycaproic acid, and mixtures thereof; and
   wherein said thin metal layer is comprised of aluminum, copper, silver, chromium, or mixtures thereof.

3. The metallized multi-layer film of claim 1 further comprising:
   (d) a skin layer on a side of said core layer opposite said first tie layer, said skin layer comprising at least a second polyolefin.

4. The metallized multi-layer film of claim 3,
   wherein said first or second polyolefin is selected from the group consisting of polyethylene, polypropylene, polybutylene, and mixtures thereof;
   wherein said functionalized polymer selected from the group consisting of vinyl acetate, ethylene vinyl acetate, maleic anhydride, and mixtures thereof;
   wherein said hydroxycarboxylic acid is selected from the group consisting of glycolic acid, 3-hydroxybutyric acid, 4-hydroxybutyric acid, 4-hydroxyvaleric acid, 5-hydroxyvaleric acid, 6-hydroxycaproic acid, and mixtures thereof; and
   wherein said thin metal layer is comprised of aluminum, copper, silver, chromium, or mixtures thereof.

5. The metallized multi-layer films of claim 1, wherein said multi-layer film is biaxially oriented.

6. A metallized multi-layer film comprising:
   (a) a core layer comprising at least a first polyolefin;
   (b) a first tie layer on a first side of said core layer, said first tie layer comprising at least a functionalized polymer selected from the group consisting of vinyl acetate, ethylene vinyl acetate, maleic anhydride, and mixtures thereof;
   (c) a metal receiving layer on a side of said first tie layer opposite said core layer, said metal receiving layer comprising i) a homopolymer of lactic acid, or ii) a copolymer of lactic acid and a hydroxycarboxylic acid, and having a thin metal layer deposited thereon;
   (d) a second tie layer on a side of said core layer opposite said first tie layer, said second tie layer comprising at least a second polyolefin or a functionalized polymer selected from the group consisting of vinyl acetate, ethylene vinyl acetate, maleic anhydride, and mixtures thereof; and
   (e) a skin layer on a side of said second tie layer opposite said core layer, said skin layer comprising at least a third polyolefin.

7. The metallized multi-layer film of claim 6,
   wherein said first, second or third polyolefin is selected from the group consisting of polyethylene, polypropylene, polybutylene, and mixtures thereof;
   wherein said functionalized polymer is selected from the group consisting of vinyl acetate, ethylene vinyl acetate, maleic anhydride, and mixtures thereof;
   wherein said hydroxycarboxylic acid is selected from the group consisting of glycolic acid, 3-hydroxybutyric acid, 4-hydroxybutyric acid, 4-hydroxyvaleric acid, 5-hydroxyvaleric acid, 6-hydroxycaproic acid, and mixtures thereof; and wherein said thin metal layer is comprised of aluminum, copper, silver, chromium, or mixtures thereof.

8. The metallized multi-layer film of claim 6, wherein said multi-layer film is biaxially oriented.

9. A metallized multi-layer film comprising:

(a) a film layer, said film layer comprising a first polyolefin selected from the group consisting of polyethylene, polypropylene, polybutylene, and mixtures thereof;

(b) a first tie layer on a first side of said film layer, said first tie layer comprising at least a maleic anhydride copolymer;

(c) a metal receiving layer on a side of said first tie layer opposite said film layer, said metal receiving layer having a thin aluminum layer deposited thereon and comprising i) a homopolymer of lactic acid, or ii) a copolymer of lactic acid and a hydroxycarboxylic acid, said hydroxycarboxylic acid is selected from the group consisting of glycolic acid, 3-hydroxybutyric acid, 4-hydroxybutyric acid, 4-hydroxyvaleric acid, 5-hydroxyvaleric acid, 6-hydroxycaproic acid, and mixtures thereof;

(d) a second tie layer on a side of said film layer opposite said first tie layer, said second tie layer comprising a second polyolefin selected from the group consisting of polyethylene, polypropylene, polybutylene, and mixtures thereof;

(e) a skin layer on a side of said second tie layer opposite said film layer, said skin layer comprising a third polyolefin selected from the group consisting of polyethylene, polypropylene, polybutylene, and mixtures thereof or a functionalized polymer selected from the group consisting of vinyl acetate, ethylene vinyl acetate, maleic anhydride, and mixtures thereof; and wherein said multi-layer film is biaxially oriented.

10. A method of making a metallized multi-layer film comprising the steps of:

(a) co-extruding in one direction at least a core layer, a first tie layer, and a metal receiving layer to form a multi-layer film;

(b) orienting said multi-layer film biaxially by stretching said film in a direction transverse to and longitudinal to said co-extrusion direction, said orienting performed in the presence of a suitable heat source; and (c) depositing aluminum metal on said metal receiving layer of said multi-layer film;

wherein said core layer is comprised of a first polyolefin selected from the group consisting of polyethylene, polypropylene, polybutylene, and mixtures thereof;

wherein said first tie layer is comprised of a functionalized polymer selected from the group consisting of vinyl acetate, ethylene vinyl acetate, maleic anhydride, and mixtures thereof; and wherein said metal receiving layer is comprised of i) a homopolymer of lactic acid, or ii) a copolymer of lactic acid and a hydroxycarboxylic acid.

11. The method of claim 10, wherein said hydroxycarboxylic acid is selected from the group consisting of glycolic acid, 3-hydroxybutyric acid, 4-hydroxybutyric acid, 4-hydroxyvaleric acid, 5-hydroxyvaleric acid, 6-hydroxycaproic acid, and mixtures thereof.

12. The method of claim 11 wherein step (a) includes co-extruding a skin layer on a side of said core layer opposite said first tie layer, wherein said skin layer is comprised of at least a second polyolefin selected from the group consisting of polyethylene, polypropylene, polybutylene, and mixtures thereof.

13. The method of claim 11 wherein step (a) includes co-extruding a second tie layer on a side of said core layer opposite said first tie layer, and co-extruding a skin layer on a side of said second tie layer opposite said core layer, wherein said second tie layer is comprised of at least a second polyolefin or a functionalized polymer selected from the group consisting of vinyl acetate, ethylene vinyl acetate, maleic anhydride, and mixtures thereof; and wherein said skin layer is comprised of at least a second polyolefin; and wherein said second polyolefin is selected from the group consisting of polyethylene, polypropylene, polybutylene, and mixtures thereof.

* * * * *